United States Patent
Qiang (10) Patent No.: US 10,462,058 B2
(45) Date of Patent: Oct. 29, 2019

(54) MULTICAST TRAFFIC MANAGEMENT IN AN OVERLAY NETWORK

(71) Applicant: Zu Qiang, Kirkland (CA)

(72) Inventor: Zu Qiang, Kirkland (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 173 days.

(21) Appl. No.: 15/521,708

(22) PCT Filed: Oct. 26, 2015

(86) PCT No.: PCT/IB2015/058253
§ 371 (c)(1),
(2) Date: Apr. 25, 2017

(87) PCT Pub. No.: WO2016/063267
PCT Pub. Date: Apr. 28, 2016

(65) Prior Publication Data
US 2017/0331746 A1    Nov. 16, 2017

Related U.S. Application Data

(60) Provisional application No. 62/068,356, filed on Oct. 24, 2014.

(51) Int. Cl.
*H04L 12/801* (2013.01)
*H04L 12/761* (2013.01)
(Continued)

(52) U.S. Cl.
CPC ............ *H04L 47/15* (2013.01); *H04L 12/184* (2013.01); *H04L 12/185* (2013.01);
(Continued)

(58) Field of Classification Search
None
See application file for complete search history.

(56) References Cited

U.S. PATENT DOCUMENTS

2008/0222277 A1    9/2008  Park et al.
2013/0250949 A1    9/2013  Farinacci et al.
(Continued)

FOREIGN PATENT DOCUMENTS

WO    2014/052485 A1    4/2014

OTHER PUBLICATIONS

International Search Report for PCT/IB2015/058253, dated Feb. 5, 2016; 6 pages.
(Continued)

*Primary Examiner* — Otis L Thompson, Jr.
(74) *Attorney, Agent, or Firm* — David J Rahmer; Ericsson Canada Inc.

(57) ABSTRACT

The use of Network Virtualization using Overlays over Layer 3 (NVO3) is a growing trend to address networking issues in data centers that make use of virtualization and cloud computing techniques. Additional considerations may be required to support application-specific multicast traffic in such overlay networks. Systems and methods are provided for an overlay network control function node to allocate one or more overlay network edge nodes to act as a multicast gateway for each network segment. The gateway can distribute multicast traffic to other participating edge nodes in its same network segment, thus reducing network traffic.

25 Claims, 7 Drawing Sheets (51) Int. Cl.
  *H04L 12/18* (2006.01)
  *H04L 29/08* (2006.01)
  *H04L 12/24* (2006.01)
  *H04L 12/715* (2013.01)

(52) U.S. Cl.
  CPC .......... *H04L 12/1886* (2013.01); *H04L 45/16* (2013.01); *H04L 67/2833* (2013.01); *H04L 41/08* (2013.01); *H04L 45/04* (2013.01); *H04L 45/64* (2013.01)

(56) References Cited

U.S. PATENT DOCUMENTS

| | | |
|---|---|---|
| 2013/0322433 A1 | 12/2013 | Tietsch et al. |
| 2014/0006585 A1 | 1/2014 | Dunbar et al. |
| 2014/0133354 A1* | 5/2014 | Scharf ............... H04L 45/42 370/254 |
| 2014/0192804 A1* | 7/2014 | Ghanwani ........... H04L 49/70 370/390 |
| 2014/0233569 A1 | 8/2014 | Yong et al. |
| 2015/0128260 A1* | 5/2015 | Qiang ............... G06F 16/13 726/22 |
| 2015/0195178 A1* | 7/2015 | Bhattacharya ...... H04L 45/745 718/1 |
| 2016/0006646 A1* | 1/2016 | Lin ................. H04L 12/6418 370/390 |
| 2016/0142220 A1* | 5/2016 | Hao ................. H04L 12/18 370/390 |
| 2016/0277210 A1* | 9/2016 | Lin ................. H04L 12/4625 |
| 2017/0118166 A1* | 4/2017 | Du .................. H04L 61/103 |
| 2018/0006930 A1* | 1/2018 | Du .................. H04L 45/16 |
| 2018/0234259 A1* | 8/2018 | Du .................. H04L 12/18 |

OTHER PUBLICATIONS

S. Hartman et al.: Security Requirements of NV03; Jul. 15, 2013; 13 pages.
A. Ghanwani et al.: Framework of Supporting Applications Specific Multicast in NV03; Jun. 6, 2014; 13 pages.
M. Lasserre et al.: Framework for DC Network Virtualization; May 21, 2014; 25 pages.
N. Bitar et al.: NV03 Data Plane Requirements; Apr. 15, 2014; 18 pages.
L. Yong et al.: Use Cases for DC Network Virtualization Overlays; Jan. 8, 2014; 16 pages.
L. Kreeger et al.: Network Virtualization NVE to NVA Control Protocol Requirements; Mar. 21, 2016; 12 pages.
Y. Rekhter et al.: Network-related VM Mobility Issues; Dec. 2, 2013; 11 pages.
D. Black et al.: an Architecture for Overlay Networks (NV03); Oct. 22, 2013; 27 pages.
T. Narten et al: Problem Statement: Overlays for Network Virtualization; 24 pages.
L. Kreeger et al.: Network Virtualization Hypervisor-to-NVE Overlay Control Protocol Requirements; Feb. 25, 2013; 16 pages.
E. Rosen et al: RFC 6513: Multicast in MPLS/BGP IP VPNs; Feb. 2012; 88 pages.

* cited by examiner

MULTICAST TRAFFIC MANAGEMENT IN AN OVERLAY NETWORK

CROSS REFERENCE TO RELATED APPLICATIONS

This application claims the benefit of priority to previously filed U.S. Provisional Patent Application No. 62/068,351 entitled "Multicast Traffic Management in an Overlay Network" and filed on Oct. 24, 2014, the contents of which are incorporated herein by reference.

TECHNICAL FIELD

This disclosure relates generally to systems and methods for handling multicast traffic in a communication network.

BACKGROUND

Network Virtualization using Overlays over Layer 3 (NVO3) is a technology that is used to address networking and addressing issues that arise in building large, multi-tenant data centers that make extensive use of server virtualization.

In the NVO3 architecture, a Network Virtualization Authority (NVA) node is a network entity that provides reachability and forwarding information to Network Virtualization Edge (NVE) nodes. An NVA can also be considered as a controller. A tenant system can be attached to an NVE node, either locally or remotely. The NVE may be capable of providing L2 and/or L3 services, where an L2 NVE can provide Ethernet Local Area Network (LAN)-like services and an L3 NVE can provide Internet Protocol (IP)/virtual routing and forwarding (VRF)-like services.

Figure 1:
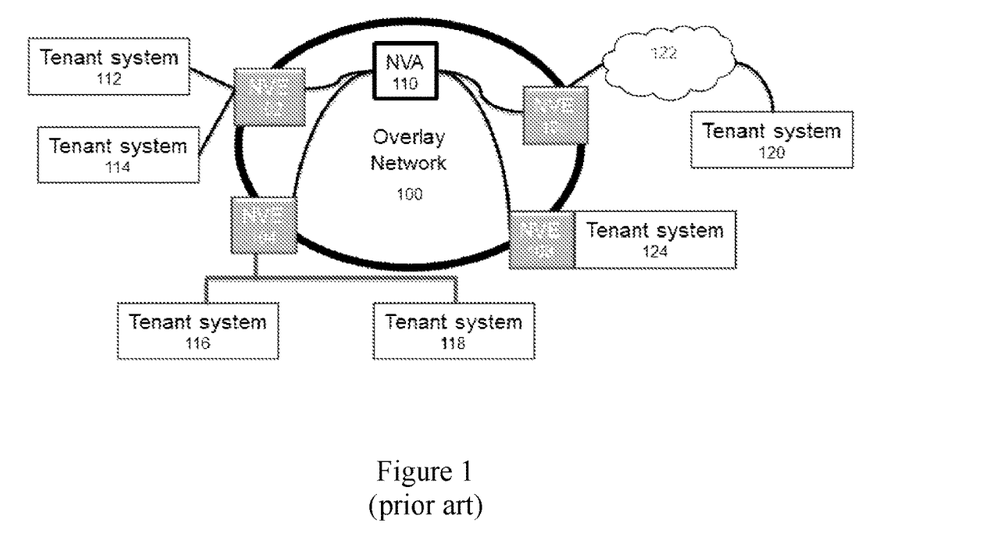
FIG. 1 illustrates an example NVO3 architecture.

FIG. 1 illustrates an example NVO3 architecture with four NVEs 102/104/106/108, each attached to at least one tenant system or network, in communication with a common NVA 110 in the overlay network 100.

In the example network of FIG. 1, NVE 102 is connected to tenant systems 112 and 114. NVE 104 is connected to tenant systems 116 and 118. NVE 106 is connected to tenant system 120 via network 122. NVE 108 is attached to tenant system 124.

An NVE is the network virtualization function that sits at the edge of an underlay network and implements L2 and/or L3 tenant separation and for hiding tenant addressing information (e.g. MAC addresses and IP addresses), tenant-related control plane activity and service contexts from the underlay nodes. NVE components may be used to provide different types of virtualized network services. NVO3 architecture allows IP encapsulation or Multiprotocol Label Switching (MPLS) encapsulation. The network-facing side of the NVE can use the underlying L3 network to tunnel frames to and from other NVEs. The tenant-facing side of the NVE can send and receives Ethernet frames to and from individual Tenant Systems. An NVE could be implemented as part of a virtual switch within a hypervisor, a physical switch or router, a Network Service Appliance, or be split across multiple devices.

Multicast traffic should be handled by the NVO3 architecture without overloading the underlying network connections of the overlay network. However, if a tenant system contains many applications attaching to a large number of NVEs, using multicast traffic replication methods may generate large amount of duplicated traffic on the same underlay network connection.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for managing multicast communication performed by an overlay network control function node. The method includes receiving a multicast join message from a first overlay network edge node requesting to join a multicast group associated with a source node. The first overlay network edge node is compared with a multicast proxy membership list associated with the requested multicast group to determine if the multicast proxy membership list includes at least one other overlay network edge node located in a common network segment as the first overlay network edge node. The multicast proxy membership list identifies a first set of nodes to which the source node sends multicast traffic. Responsive to determining that a second overlay network edge node included in the multicast proxy membership list is located in the common network segment as the first overlay network edge node, an update multicast group message is sent to the second overlay network edge node to add the first overlay network edge node to a multicast group distribution list stored at the second overlay network edge node. The multicast group distribution list identifies a second set of nodes to which the second overlay network edge node forwards multicast traffic received from the source node.

In another aspect of the present invention, there is provided an overlay network control function node for managing multicast communication, the overlay network control function node comprising processing circuitry including a processor and a memory. The memory contains instructions executable by the processor whereby the network node is operative to receive a multicast join message from a first overlay network edge node requesting to join a multicast group associated with a source node. The overlay network control function node is operative to compare the first overlay network edge node with a multicast proxy membership list associated with the requested multicast group to determine if the multicast proxy membership list includes at least one other overlay network edge node located in a common network segment as the first overlay network edge node. The multicast proxy membership list identifies a first set of nodes to which the source node sends multicast traffic. The overlay network control function node is operative to, responsive to determining that a second overlay network edge node included in the multicast proxy membership list is located in the common network segment as the first overlay network edge node, send an update multicast group message to the second overlay network edge node to add the first overlay network edge node to a multicast group distribution list stored at the second overlay network edge node. The multicast group distribution list identifies a second set of nodes to which the second overlay network edge node forwards multicast traffic received from the source node.

In another aspect of the present invention, there is provided a network virtualization authority node comprising a receiving module, a proxy Network Virtualization Edge (NVE) list module, a determination module, and a participant NVE list module. The receiving module is configured for receiving a multicast join message from a first NVE requesting to join a multicast group associated with a source NVE. The proxy NVE list module is configured for comparing the first NVE with a multicast proxy membership list associated with the requested multicast group to determine if the multicast proxy membership list includes at least one NVE located in a common network segment as the first NVE. The determination module is configured for determining that a second NVE belongs to the requested multicast group associated with the source NVE, wherein the first NVE and the second NVE are located in the common network segment. The participant NVE list module is configured for sending an update multicast group message to the second NVE to update a multicast group distribution list stored at the second NVE to include the first NVE.

In another aspect of the present invention, there is provided a computer readable storage medium storing executable instructions, which when executed by a processor, cause the processor to receive a multicast join message from a first overlay network edge node requesting to join a multicast group associated with a source node; to compare the first overlay network edge node with a multicast proxy membership list associated with the requested multicast group to determine if the multicast proxy membership list includes at least one other overlay network edge node located in a common network segment as the first overlay network edge node; and responsive to determining that a second overlay network edge node included in the multicast proxy membership list is located in the common network segment as the first overlay network edge node, to send an update multicast group message to the second overlay network edge node to add the first overlay network edge node to a multicast group distribution list stored at the second overlay network edge node.

In some embodiments, the multicast proxy membership list contains only one proxy overlay network edge node per network segment.

In some embodiments, the multicast group distribution list stored at the second overlay network edge node is updated without updating the multicast proxy membership list stored at the source node.

In some embodiments, the overlay network control function node can determine that the second overlay network edge node is assigned a proxy gateway function for the common network segment.

In some embodiments, the overlay network control function node can determine that the first overlay network edge node should replace the second overlay network edge node as a proxy gateway function for the common network segment. The determination that the first overlay network edge node should replace the second overlay network edge node as a proxy gateway function for the common network segment can be made in accordance with minimizing network multicast traffic. The overlay network control function node can further send an update multicast proxy membership message to modify the multicast proxy membership list stored at the source node to remove the second overlay network edge node from the list and to add the first overlay network edge node to the list. The overlay network control function node can further modify the multicast group distribution list to remove the first overlay network edge node and to add the second overlay network edge node. The overlay network control function node can further send the multicast group distribution list to the first overlay network edge node.

In some embodiments, the overlay network control function node can assign the first overlay network edge node as a proxy gateway function for the network segment, in response to determining that no overlay network edge node included in the multicast proxy membership list is located in the common network segment as the first overlay network edge node. The overlay network control function node can send an update multicast proxy membership message to modify the multicast proxy membership list stored at the source node to add the first overlay network edge node.

The various aspects and embodiments described herein can be combined alternatively, optionally and/or in addition to one another.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Embodiments of the present invention are directed to mechanisms for an overlay network control function node, such as an NVA, to assign or allocate one or more multicast gateways for each tenant system multicast group based on the tenant system network architecture. An NVA can assign a multicast gateway proxy function to one of the participating overlay network edge nodes, such as an NVE, in a particular network segment. A "participating" NVE can refer to an NVE which has at least one virtual machine (VM) of a given tenant system attached.

Those skilled in the art will appreciate that, although embodiments will be described with respect to the NVO3 architecture, the various embodiments described herein can be applicable to any type of nodes and network, such as an overlay network.

The terms "proxy" and "gateway" will be used interchangeably herein to refer to a node that is logically located in the middle of the multicast forwarding path and can duplicate and forward received multicast packets towards end points of the multicast forwarding path.

Those skilled in the art will appreciate that network segmentation refers to the concept of dividing a communication network into portions or subnetworks, each being a network segment. The specific nature and extent of a network segment can depend on the type of network and/or the devices or nodes of the network.

Figure 2:
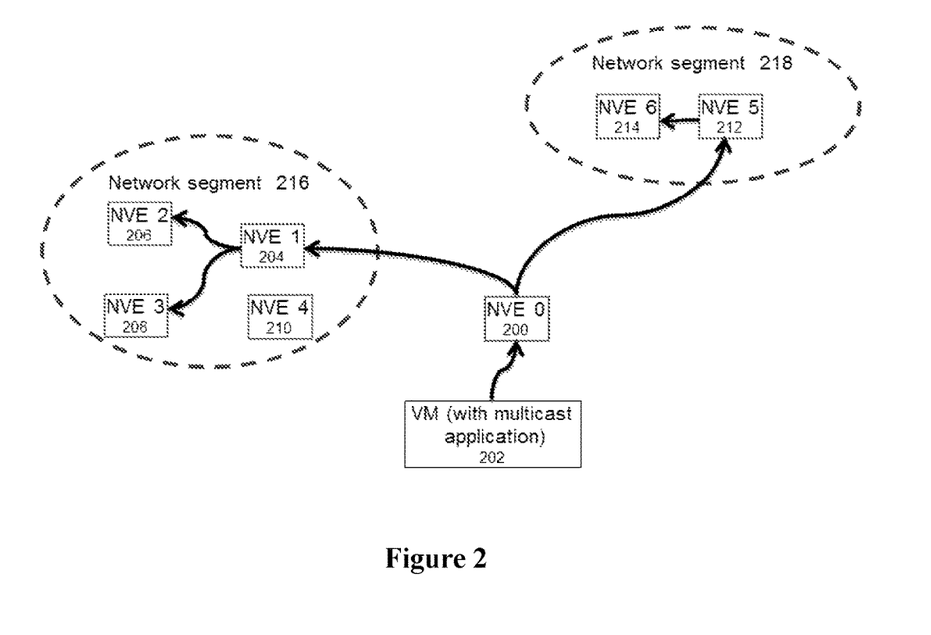
FIG. 2 illustrates an example network multicast application.

Referring now to FIG. 2, an example of a network multicast application is illustrated in the context of an NVO3 network.

In this example, NVE0 200 will be referred to as the "source NVE" as it is the NVE to which a multicasting application (e.g. VM 202) is attached. It can be assumed that the source NVE 200 is aware if it has an attached multicast application VM 202. An NVE may learn this via overlay network provisioning or by using some kind of multicast monitoring functions, e.g. Internet Group Management Protocol (IGMP) snooping. Those skilled in the art will appreciate that the multicast monitoring can be implemented in a variety of different ways. When a multicasting VM is launched, the attached NVE knows, or learns, of its existence. Source NVE 200 needs to register itself with the NVA (not illustrated in FIG. 2) in order to enable the multicast distribution mechanism. The source NVE 200 can inform the NVA of the multicast group information, including the source NVE 200 address and the multicast group address. Once the source NVE 200 registration is completed, based on the multicast registration information and a multicast proxy function role selection decision, a Proxy NVE list and at least one Participant NVE list can be created by the NVA.

The Proxy NVE list is a list of Proxy NVEs to which the source NVE 200 will send multicast traffic. It can be created by the NVA and stored by the source NVE 200 for use in multicast traffic duplication and distribution to the members of the Proxy NVE list. Source NVE 200 can be updated with the Proxy NVE list by the NVA using NVA-NVE control plane signaling.

The Participant NVE list is a list of participating or receiving NVEs (e.g. a multicast group participant is attached). It is created by the NVA and stored by a Proxy NVE for use in multicast traffic duplication and distribution. In some embodiments, a plurality of Participant NVE lists can be created by the NVA, each being unique to the distribution list of a specific Proxy NVE. The Participant NVE list identifies a set of nodes to which a Proxy NVE will forward multicast traffic that it receives from the source NVE.

In the example of FIG. 2, NVE1 204, NVE2 206, NVE3 208, NVE5 212 and NVE6 214 each have at least one attached VM participating the in the multicast group. Similar to as was described for the source NVE 200, it is assumed that a receiving NVE knows if an attached VM would like to join a multicast group. The NVE may learn this via overlay network provisioning or by using other means. Once a VM multicast registration is accepted, the attached NVE shall inform the NVA with the multicast group information, including the source NVE address and the multicast group address. This attached NVE becomes a receiving NVE of the multicast group. The NVA may create multiple receiving NVE lists per multicast group. However each receiving NVE can only belong to one receiving NVE list. And the receiving NVE list can only be used by one Proxy NVE. This is to avoid any unnecessary traffic duplication and looping.

A Proxy NVE is a receiving NVE that is selected by the NVA to perform a gateway distribution function. It is assigned the role/responsibility of distributing the received multicast traffic to other receiving NVEs. The multicast proxy function role is dynamically allocated by the NVA on a per multicast group and per tenant system basis. A Proxy NVE can receive multicast traffic from a source NVE and distribute it to other receiving NVEs included in the Participant NVE list.

When receiving the multicast registration information, the NVA can select one NVE as a multicast proxy. The selection may be based on several conditions, such as forwarding capability, location, network segmentations, etc. When there are more NVEs joining one multicast group, one of the NVEs will be selected and assigned with the multicast proxy function role. The NVA can assign the multicast proxy function role to the selected NVE by sending a multicast assignment message to the NVE. A Participant NVE list can also be included in the same message or can be included in a subsequent message. The NVA can add the selected NVE address into the multicast Proxy NVE list and update the source NVE. In some network architectures, multiple proxy NVEs on the same path may be possible.

Returning to the example network of FIG. 2, NVE1 204, NVE2 206, NVE3 208 and NVE4 210 reside in a common network segment 216. NVE5 212 and NVE6 214 reside in another network segment 218. In some embodiments, NVE0 200 and VM 202 can also reside in a network segment. In this example embodiment, NVE1 204 and NVE5 212 have been selected and assigned the gateway proxy roles for their respective network segments 216 and 218. There are VMs registered to the multicast group attached to NVE1 204, NVE2 206, NVE3 208, NVE5 212, and NVE6 214. There are no registered VMs attached to NVE4 210.

In this case, the NVA can create a Proxy NVE list consisting of NVE1 204 and NVE5 212 for a particular multicast group. The Proxy NVE list can be stored at the source NVE0 200. The NVA can further create Participant NVE lists for each network segment having a participant in the multicast group. For network segment 216, a first Participant NVE list will include NVE2 206 and NVE3 208. The first Participant NVE list can be stored at the proxy gateway NVE1 204. A second Participant NVE list includes NVE6 214, for network segment 218, and can be stored at the proxy gateway NVE5 212. The use of multiple distribution lists can create a dynamic hierarchy, or tree, for distributing the multicast traffic.

Optionally, a multicast proxy function reselection procedure can be triggered if a new NVE joins a multicast group with an existing Proxy NVE (e.g. located in its same network segment). Or alternatively, if a NVE which has been assigned the multicast proxy function role initiates a deregistration procedure, a new Proxy NVE selection will also be required. When the reselection procedure is triggered, the NVA can evaluate all participating NVEs of the given multicast group. If the NVA determines that a new NVE has a better capability to perform the multicast proxy function role (e.g. the new NVE is located closer to the Data Center gateway), it may re-assign the role to the new NVE.

A multicast proxy function role assignment message will be sent to the new selected NVE. The multicast Participant NVE list can also be forwarded. A multicast proxy function role unassigned message will be sent to the old Proxy NVE. The multicast proxy NVE list shall be updated, and the source NVE shall be informed accordingly.

The Proxy NVE selection (or reselection) procedure can be based on the network segmentation of the participating NVEs. As described above, the multicast proxy role of one network segment can be dynamic allocated by the NVA at a per multicast group and per network segment of one tenant system. When there is only one NVE within a given network segment joining the given multicast group, that NVE can automatically be selected as the multicast GW function.

When there are more than one NVE within the same network segment joining the multicast group, one of the NVEs will be selected for the multicast proxy function role. The selection of an NVE for the multicast proxy function role can made in accordance with one or more criteria as have been discussed herein.

Those skilled in the art will readily understand that a network segment can refer to a network location in either an overlay or underlay network. In some embodiments, the NVA can translate an NVE overlay network address into its underlay address to determine if it resides in the same underlay network segment as another NVE. A network segment can include a tenant network, an underlay network, a data center, a host, etc.

According to some embodiments, when receiving a multicast packet from the attached VM 202, source NVE0 200 can process the packet as follows. If the multicast Proxy NVE list for the associated multicast group is empty, source NVE0 200 will not forward the received multicast packet from the attached VM 202. If the multicast Proxy NVE list of the associated multicast group is not empty, source NVE0 200 can duplicate, encapsulate, and forward the received multicast packet to each Proxy NVE (NVE1 204 and NVE5 212 in the example of FIG. 2) included in the multicast Proxy NVE list received from NVA.

A Proxy NVE 204/212 has the responsibility to distribute the multicast traffic based on its stored multicast Participant NVE list. When receiving a multicast packet from the source NVE0 200, each proxy NVE 204/212 can de-encapsulate, duplicate, encapsulate, and forward the multicast packet to the destination NVEs in its stored Participant NVE list. In the example of FIG. 2, Proxy NVE1 204 will forward multicast packets to NVE2 206 and NVE3 208, while Proxy NVE5 will forward multicast packets to NVE6 214.

When receiving a multicast packet from a Proxy NVE 204 or 212, a receiving NVE (NVE2 206, NVE3 208, NVE6 214) can de-encapsulate the multicast packet and forward it to the attached VM which has registered to the multicast group.

Similar to the multicast registration procedure, it is also assumed that an NVE knows if an attached VM discontinues participating in the multicast group. The NVE may learn this via overlay network provisioning, multicast deregistration, VM deactivation, VM network disconnection, etc. The NVE can inform the NVA when all of its attached VMs of a given multicast group have discontinued participating in the multicast group. The NVE can then be removed by the NVA from the receiving NVE list of the multicast group. The multicast proxy NVE will be updated. If the NVE had multicast proxy function role assigned, the multicast proxy function reselection procedure may be triggered.

In order to provide optimized routing for a particular multicast flow and to improve the multicast scalability as unicast traffic, the source NVE0 200 can forward a received multicast packet to a destination NVE only if it has at least one attached VM participating in that multicast group. Duplication of the multicast packet to the destination NVEs on the same network connection can be avoided. Use of the multicast distribution proxy function for a multicast group is similar to configuring a distribution tree mechanism, but relies on the NVA having knowledge of the network segmentation/topology and making distribution decisions based on NVEs residing in the same network segment. The NVA, which is effectively the centralized control node of the NVO3 architecture, can select the proxy NVEs from the participating NVEs to setup sub-distribution groups for each multicast group, for each network segment. To avoid generating large amounts of duplicated traffic on the same overlay and/or underlay network connection, the source NVE0 200 can duplicate the multicast traffic to a limited number of proxy NVEs 204/212 in accordance with the Proxy NVE list. Then the proxy NVEs 204/212 can further duplicate the multicast traffic and forward it to the remaining receiving NVEs in accordance with the Participant NVE list. Because of the control plane component of the NVO3 architecture, the neither the source NVE0 200 nor the proxy NVEs 204/212 require full forwarding knowledge for all participating NVEs in the multicast group.

Figure 3:
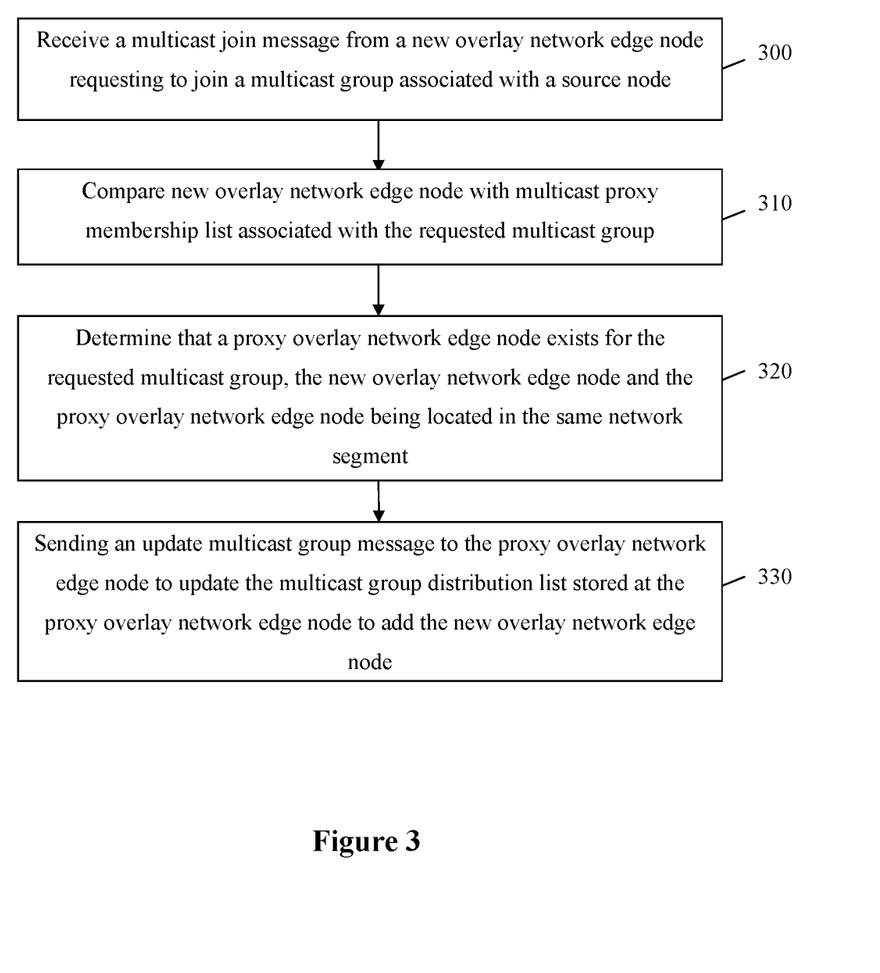
FIG. 3 is a flow chart illustrating a method for managing multicast communication.

FIG. 3 is a flow chart illustrating a method for managing multicast communication. The method of FIG. 3 can be implemented by an overlay network control function node or any multicast manager function in a communication network. The communication network can include an overlay network architecture such as NVO3. In some embodiments the overlay network control function node can be a Network Virtualization Authority (NVA) node.

The method of FIG. 3 begins by the overlay network control function node receiving a multicast join message from a new overlay network edge node requesting to join (or subscribe to) a multicast group that is associated with a source node (block 300). The source node can be the node configured to broadcast the multicast traffic or a node receiving multicast traffic for distribution from a multicasting application. In some embodiments the overlay network edge node can be a Network Virtualization Edge (NVE) node. In some embodiments the source node can be a source NVE node.

The overlay network control function node compares the new overlay network edge node with a multicast proxy membership list associated with the requested multicast group to determine if the source node is already multicasting to another overlay network edge node in the same network segment as the new requesting overlay network edge node (block 310). This comparison can be based at least in part on the network topology. If yes, the overlay network control function node can determine that a proxy overlay network edge node is already established and resides in the same network segment as the new overlay network edge node for the requested multicast group (block 320). If a proxy overlay network edge node exists in the given network segment, a multicast group distribution list may include one or more receiving overlay network edge nodes that the proxy overlay network edge node will forward multicast messages received from the source node towards.

The overlay network control function node can then send an update multicast group message to the proxy overlay network edge node to update its multicast group distribution list to add the new overlay network edge node to the list (block 330). In some embodiments, the multicast group distribution list stored at the proxy overlay network edge node can be updated without updating a multicast proxy membership list which is stored at the source node.

The step of determining that a proxy overlay network edge node for the requested multicast group exists can optionally include comparing the network segment of each of the members of the multicast proxy group associated with the source node with the network segment of the new requesting overlay network edge node. This comparison can be made in accordance with the network topology, considering the overlay and/or underlay network topology.

In some embodiments, the proxy overlay network edge node can be selected for a network segment in accordance with minimizing the duplication of the multicast traffic over the underlying physical network connections. The "backbone" network topology and connections between the source node and the requesting overlay network edge node(s) can be analyzed to select an optimal proxy overlay network edge node candidate for each network segment.

In an optional embodiment, the overlay network control function node can determine if the new overlay network edge node should replace the existing proxy overlay network edge node for the network segment. This determination can be made in accordance with minimizing traffic over the network and/or other criteria such as the capabilities of the participating overlay network edge nodes in the multicast group. If the new overlay network edge node is selected to perform the proxy function, the overlay network control function node can send an instruction to modify the multicast proxy membership list stored at the source node to remove the old proxy overlay network edge node and to add the new overlay network edge node as the proxy for that network segment. Further, the new overlay network edge node can be sent the multicast group distribution list for its network segment.

In the alternative case when the overlay network control function node determines that there is no existing proxy overlay network edge node for the network segment of a new overlay network edge node, the new overlay network edge node can be assigned the proxy overlay network edge node role for the network segment. In this case, an instruction is sent to modify the multicast proxy membership list stored at the source node to include the new overlay network edge node. The new overlay network edge node, which is now serving as the proxy function for its network segment, may subsequently be sent a multicast group distribution list if there are one or more overlay network edge nodes in the same network segment that have joined the multicast group. In the scenario where the new overlay network edge node is the only node in its network segment that is subscribed to the multicast group, the multicast group distribution list may be empty.

Figure 4:
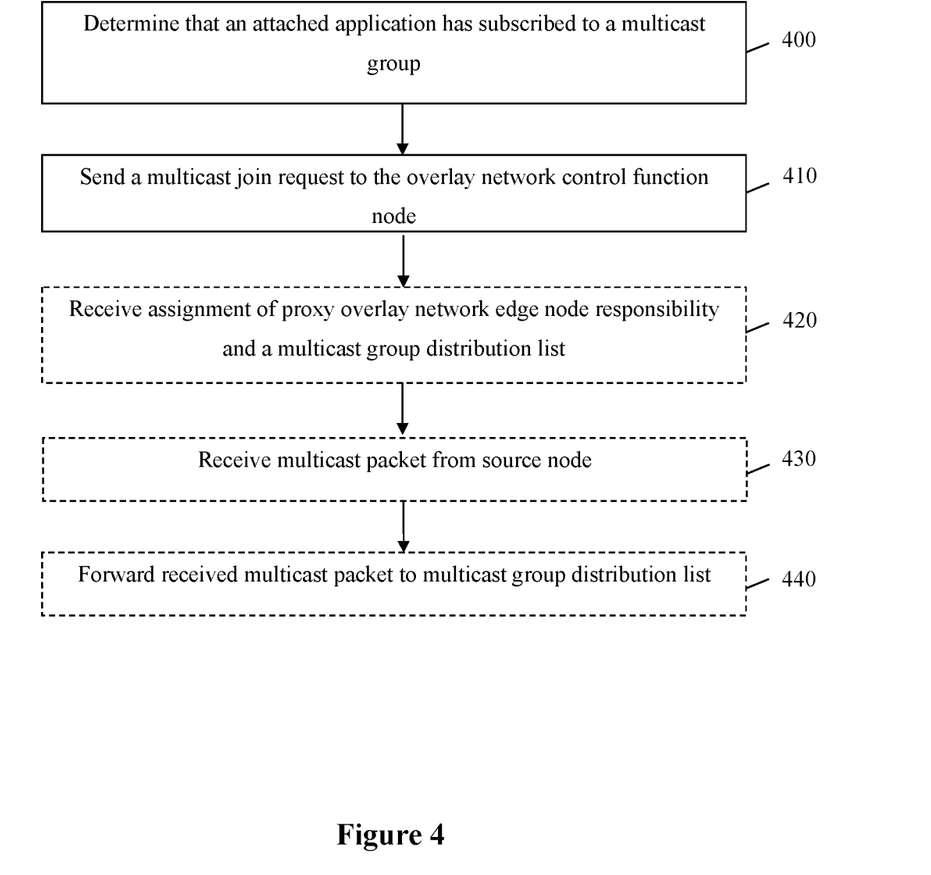
FIG. 4 is a flow chart illustrating a method for joining a multicast group.

FIG. 4 is a flow chart illustrating a method for joining a multicast group. The method of FIG. 4 can be implemented by an overlay network edge node such as an NVE. The method begins by determining that an application attached to the NVE has subscribed to a multicast group (block 400). The application can be running in a virtual machine (VM) that is connected to the NVE. The multicast group can have an associated source NVE that is configured to broadcast the multicast traffic. The NVE then sends a multicast join request to a multicast manager or controller, such as an NVA, to join the particular multicast group (block 410).

In an optional embodiment, the NVE receives an indication from the NVA that it has been selected and assigned as the proxy NVE function for the multicast group for the network segment that the NVE is located in (block 420). The NVE may also receive, in the same message or in another message, a multicast group distribution list. The multicast group distribution list can include one or more other NVEs located in the same network segment that the NVE is responsible for distributing multicast traffic to. The NVE can store this multicast group distribution list in memory.

The NVE can receive a multicast packet from the source NVE (block 430) and subsequently forward it to all NVEs in the multicast group distribution list (block 440).

In some embodiments, the NVE can receive instruction from the NVA to update its multicast group distribution list to add or remove an NVE(s) to/from the list. Optionally, the NVE may receive a subsequent message from the NVA indicating that it is no longer responsible for the proxy NVE function for its network segment. In this case, the NVE can delete its stored multicast group distribution list. The NVE can receive subsequent multicast traffic from the newly elected Proxy NVE in its network segment.

In an alternative embodiment, when the NVE does not receive an indication from the NVA that it has been selected as the proxy NVE function, the NVE can receive multicast traffic associated with the source NVE from another NVE located in its network segment.

Figure 5:
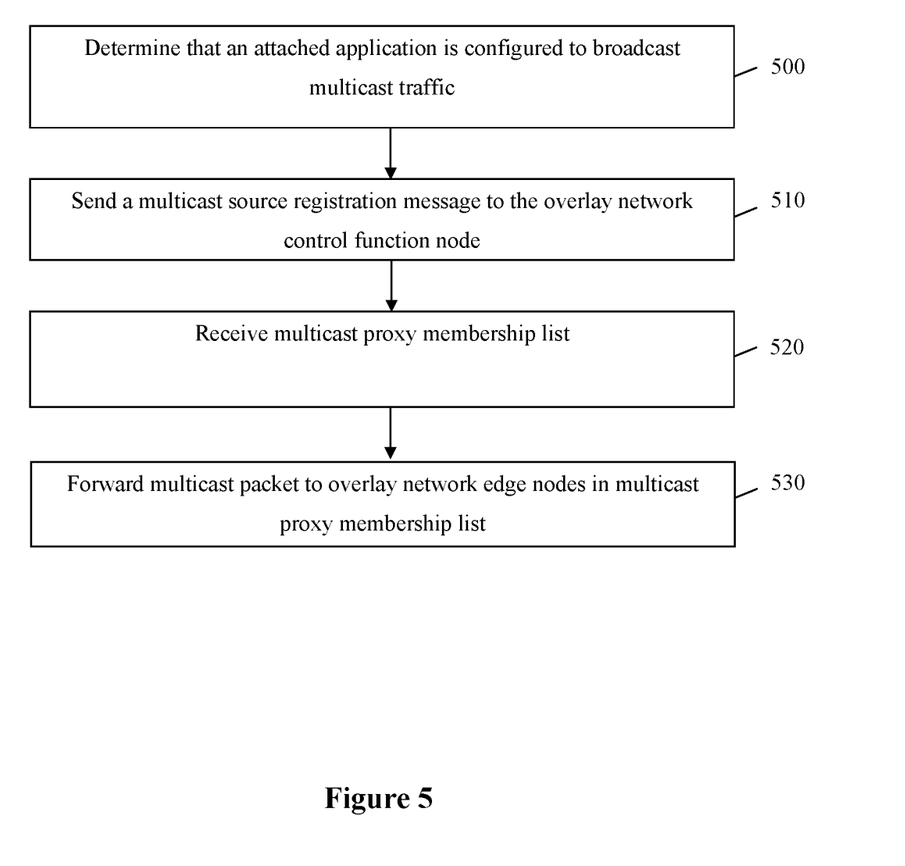
FIG. 5 is a flow chart illustrating a method for broadcasting multicast traffic.

FIG. 5 is a flow chart illustrating a method for broadcasting multicast traffic. The method of FIG. 4 can be implemented by a source node as has been described herein. The source node can be a source NVE node. The method begins by determining that an application (or virtual machine) attached to the NVE is configured to broadcast multicast traffic (block 500). The NVE sends a multicast source registration message to the NVA to register itself as the source node for the associated multicast group (block 510). The NVA responds with a multicast proxy membership list for the multicast group (block 520). The multicast proxy membership list can include a number of NVEs that will act as the proxy gateway function to distribute multicast traffic for their respective network segments. The source node duplicates and forwards any received multicast packets to the NVEs included in the multicast proxy membership list (block 530).

Figure 6:
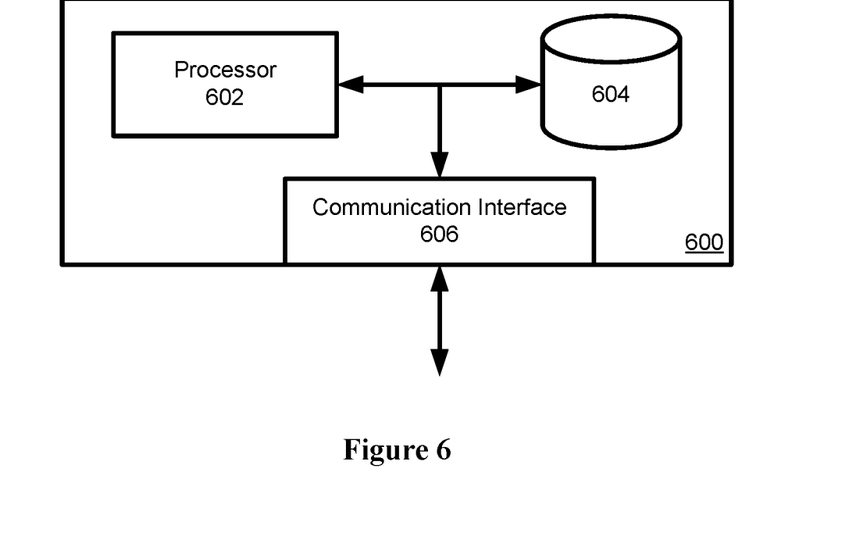
FIG. 6 is a block diagram of a network element.

FIG. 6 is a block diagram illustrating an example network element 600 according to embodiments of the present invention. Network element 600 can be any of the overlay network control function nodes (e.g. an NVA) and/or the overlay network edge nodes (e.g. an NVE) as have been described herein. The network element 600 includes processing circuitry which includes a processor 602, a memory or instruction repository 604 and a communication interface 606. The communication interface 606 can include at least one input port and at least one output port. The memory 604 contains instructions executable by the processor 602 whereby the network element 600 is operable to perform the various embodiments as described herein. In some embodiments, the network element 600 can be a virtualized application hosted by underlying physical hardware. Network element 600 can be configured to implement the methods and procedures illustrated in FIGS. 3, 4 and 5.

In some embodiments, network element 600 can be an overlay network control function node such as the NVA node as described herein. The overlay network control function node 600 can be operative to receive a multicast join message from a first overlay network edge node, such as a NVE, requesting to join a multicast group associated with a source node. The overlay network control function node 600 can be operative to compare the first overlay network edge node with a multicast proxy membership list associated with the requested multicast group to determine if the multicast proxy membership list includes at least one other overlay network edge node located in a common network segment as the first overlay network edge node. This comparison can be made in accordance with network topology and network segmentation information. The multicast proxy membership list can be configured to identify a first set of nodes to which the source node sends multicast traffic. The overlay network control function node 600 can be operative to, responsive to determining that a second overlay network edge node included in the multicast proxy membership list is located in the common network segment as the first overlay network edge node, send an update multicast group message to the second overlay network edge node to add the first overlay network edge node to a multicast group distribution list stored at the second overlay network edge node. The multicast group distribution list can be configured to identify a second set of nodes to which the second overlay network edge node forwards multicast traffic received from the source node.

Figure 7:
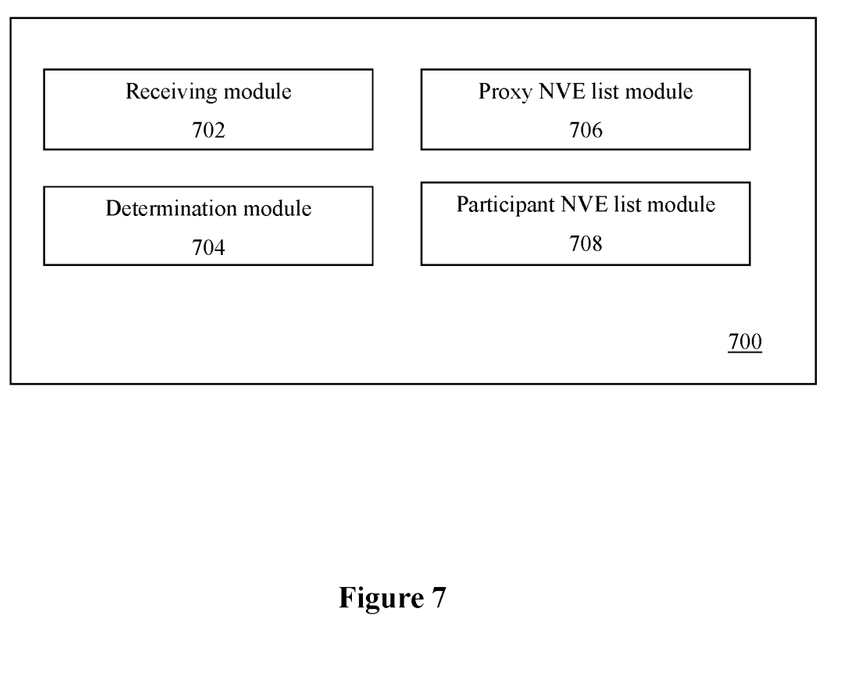
FIG. 7 is a block diagram of a network virtualization authority node.

FIG. 7 is a block diagram of an example network virtualization authority (NVA) node 700. The NVA node 700 can include a receiving module 702, a determination module 704, a proxy NVE list module 706 and a participant NVE list module 708. The receiving module 702 is configured to receive a multicast join message from a first NVE requesting to join a multicast group associated with a source NVE. The determination module 704 is configured to determine that a second NVE belongs to the requested multicast group associated with the source NVE, wherein the first NVE and the second NVE are located in a common network segment. The participant NVE list module 706 is configured to send an update multicast group message to the second NVE to update a multicast group distribution list stored at the second NVE to include the first NVE. The proxy NVE list module 708 is configured to manage a multicast proxy membership list stored at the source NVE.

Embodiments of the invention may be represented as a software product stored in a machine-readable medium (also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for managing multicast communication, by an overlay network control function node, the method comprising:
    receiving a multicast join message from a first overlay network edge node requesting to join a multicast group associated with a source node;
    comparing the first overlay network edge node with a multicast proxy membership list associated with the requested multicast group to determine if the multicast proxy membership list includes at least one other overlay network edge node located in a common network segment as the first overlay network edge node, the multicast proxy membership list identifying a first set of nodes to which the source node sends multicast traffic; and
    responsive to determining that a second overlay network edge node included in the multicast proxy membership list is located in the common network segment as the first overlay network edge node, sending an update multicast group message to the second overlay network edge node to add the first overlay network edge node to a multicast group distribution list stored at the second overlay network edge node, the multicast group distribution list identifying a second set of nodes to which the second overlay network edge node forwards multicast traffic received from the source node.

2. The method of claim 1, wherein the multicast proxy membership list contains only one proxy overlay network edge node per network segment.

3. The method of claim 1, wherein the multicast group distribution list stored at the second overlay network edge node is updated without updating the multicast proxy membership list stored at the source node.

4. The method of claim 1, further comprising, determining that the second overlay network edge node is assigned a proxy gateway function for the common network segment.

5. The method of claim 1, further comprising, determining that the first overlay network edge node should replace the second overlay network edge node as a proxy gateway function for the common network segment.

6. The method of claim 5, wherein the determination that the first overlay network edge node should replace the second overlay network edge node as a proxy gateway function for the common network segment is in accordance with minimizing network multicast traffic.

7. The method of any of claim 5, further comprising, sending an update multicast proxy membership message to modify the multicast proxy membership list stored at the source node to remove the second overlay network edge node from the list and to add the first overlay network edge node to the list.

8. The method of any claim 5, further comprising, modifying the multicast group distribution list to remove the first overlay network edge node and to add the second overlay network edge node.

9. The method of claim 5, further comprising, sending the multicast group distribution list to the first overlay network edge node.

10. The method of claim 1, wherein, responsive to determining that no overlay network edge node included in the multicast proxy membership list is located in the common network segment as the first overlay network edge node, assigning the first overlay network edge node as a proxy gateway function for the network segment.

11. The method of claim 10, further comprising, sending an update multicast proxy membership message to modify the multicast proxy membership list stored at the source node to add the first overlay network edge node.

12. The method of claim 1, wherein the overlay network control function node is a Network Virtualization Authority (NVA).

13. The method of claim 1, wherein the first overlay network edge node is a Network Virtualization Edge (NVE).

14. An overlay network control function node for managing multicast communication, the overlay network control function node comprising processing circuitry including a processor and a memory, the memory containing instructions executable by the processor whereby the network node is operative to:
    receive a multicast join message from a first overlay network edge node requesting to join a multicast group associated with a source node;
    compare the first overlay network edge node with a multicast proxy membership list associated with the requested multicast group to determine if the multicast proxy membership list includes at least one other overlay network edge node located in a common network segment as the first overlay network edge node, the multicast proxy membership list identifying a first set of nodes to which the source node sends multicast traffic; and responsive to determining that a second overlay network edge node included in the multicast proxy membership list is located in the common network segment as the first overlay network edge node, send an update multicast group message to the second overlay network edge node to add the first overlay network edge node to a multicast group distribution list stored at the second overlay network edge node, the multicast group distribution list identifying a second set of nodes to which the second overlay network edge node forwards multicast traffic received from the source node.

15. The overlay network control function node of claim 14, wherein the multicast proxy membership list contains only one proxy overlay network edge node per network segment.

16. The overlay network control function node of claim 14, wherein the multicast group distribution list stored at the second overlay network edge node is updated without updating the multicast proxy membership list stored at the source node.

17. The overlay network control function node of claim 14, further operative to determine that the second overlay network edge node is assigned a proxy gateway function for the common network segment.

18. The overlay network control function node of claim 14, further operative to determine that the first overlay network edge node should replace the second overlay network edge node as a proxy gateway function for the common network segment.

19. The overlay network control function node of claim 18, wherein the determination that the first overlay network edge node should replace the second overlay network edge node as a proxy gateway function for the common network segment is in accordance with minimizing network multicast traffic.

20. The overlay network control function node of claim 18, further operative to send an update multicast proxy membership message to modify the multicast proxy membership list stored at the source node to remove the second overlay network edge node from the list and to add the first overlay network edge node to the list.

21. The overlay network control function node of claim 18, further operative to modify the multicast group distribution list to remove the first overlay network edge node and to add the second overlay network edge node.

22. The overlay network control function node of claim 18, further operative to send the multicast group distribution list to the first overlay network edge node.

23. The overlay network control function node of claim 14, further operative to, responsive to determining that no overlay network edge node included in the multicast proxy membership list is located in the common network segment as the first overlay network edge node, assign the first overlay network edge node as a proxy gateway function for the network segment.

24. The overlay network control function node of claim 23, further operative to send an update multicast proxy membership message to modify the multicast proxy membership list stored at the source node to add the first overlay network edge node.

25. A computer readable storage medium storing executable instructions, which when executed by a processor, cause the processor to:

receive a multicast join message from a first overlay network edge node requesting to join a multicast group associated with a source node;

compare the first overlay network edge node with a multicast proxy membership list associated with the requested multicast group to determine if the multicast proxy membership list includes at least one other overlay network edge node located in a common network segment as the first overlay network edge node, the multicast proxy membership list identifying a first set of nodes to which the source node sends multicast traffic; and responsive to determining that a second overlay network edge node included in the multicast proxy membership list is located in the common network segment as the first overlay network edge node, send an update multicast group message to the second overlay network edge node to add the first overlay network edge node to a multicast group distribution list stored at the second overlay network edge node, the multicast group distribution list identifying a second set of nodes to which the second overlay network edge node forwards multicast traffic received from the source node.

* * * * *